Figure 1:
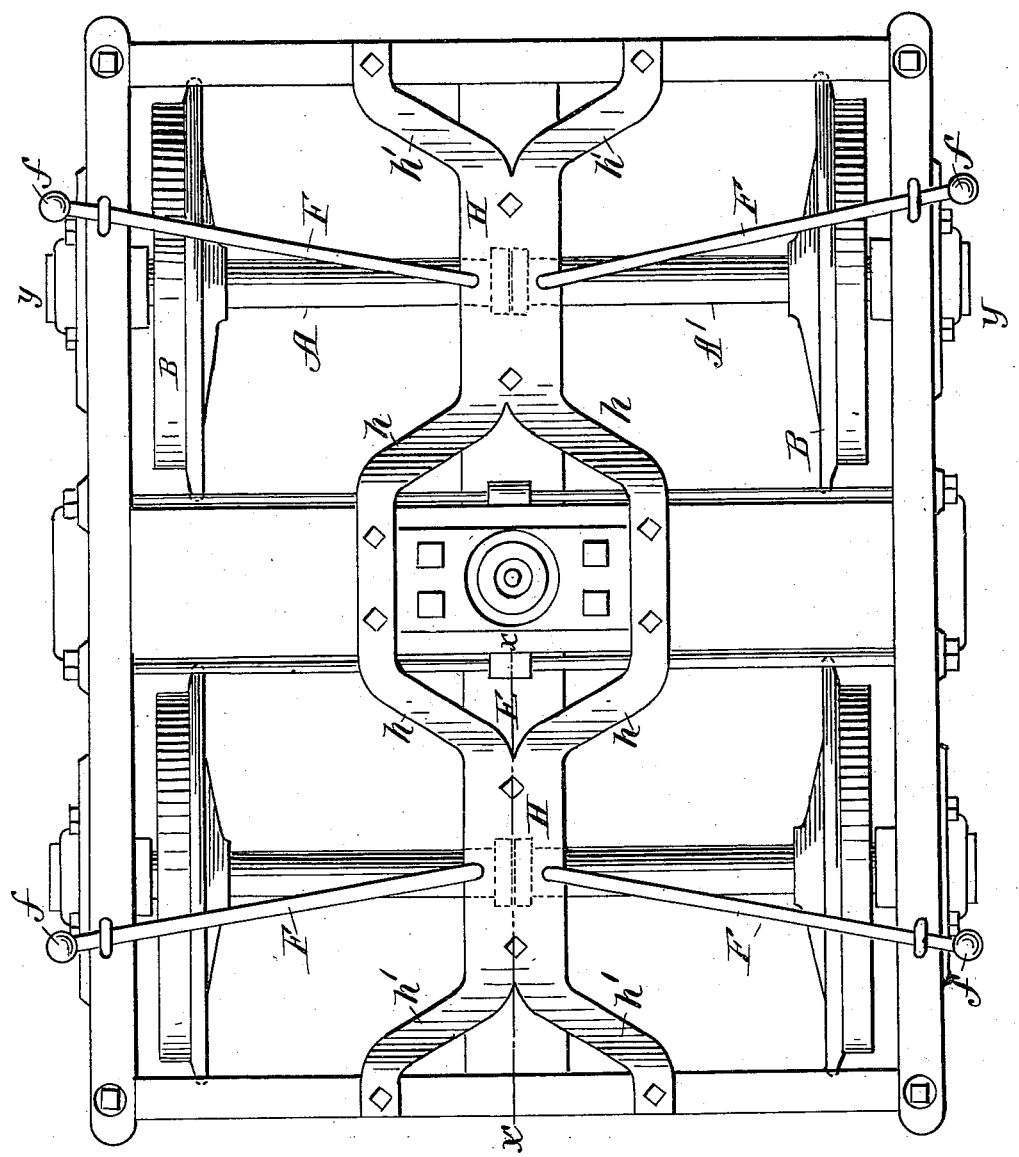

(No Model.) 2 Sheets—Sheet 1.

W. J. MURRAY.
CAR AXLE.

No. 355,463. Patented Jan. 4, 1887.

WITNESSES:

INVENTOR:
W. J. Murray
BY Munn & Co
ATTORNEYS.

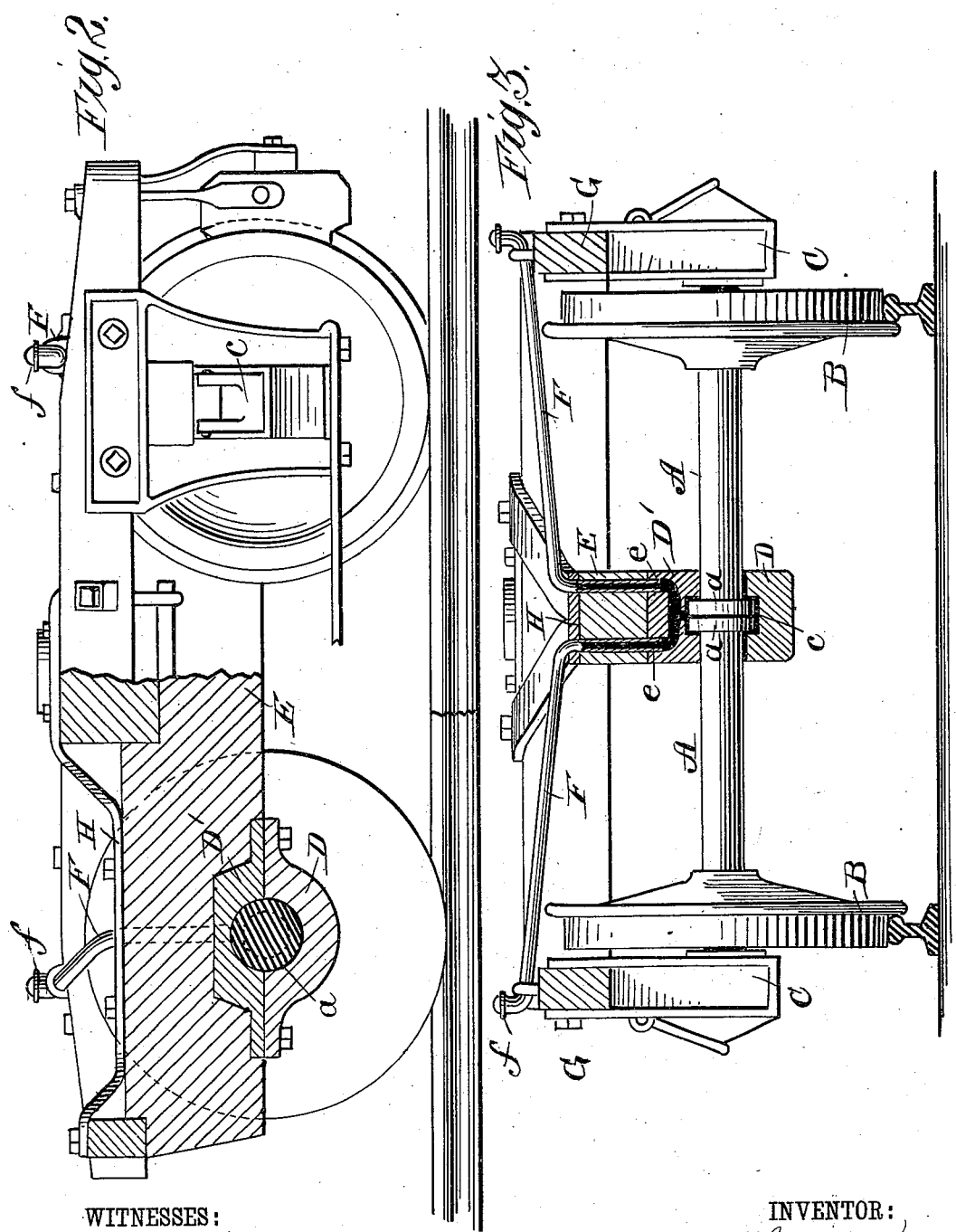

UNITED STATES PATENT OFFICE.

WILLIAM JOHN MURRAY, OF JOLON, CALIFORNIA.

CAR-AXLE.

SPECIFICATION forming part of Letters Patent No. 355,463, dated January 4, 1887

Application filed April 13, 1886. Serial No. 198,715. (No model.)

*To all whom it may concern:*

Be it known that I, WILLIAM JOHN MURRAY, of Jolon, in the county of Monterey and State of California, have invented a new and Improved Car-Axle, of which the following is a full, clear, and exact description.

My invention relates to the construction of a car-axle, the object of the invention being to allow each wheel carried by the axle to revolve independently of the other.

The invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a plan view of a car-truck provided with my improved axle. Fig. 2 is a side view of the same, certain portions of the truck being shown in section, taken on line $x\ x$ of Fig. 1; and Fig. 3 is a cross-sectional view taken on line $y\ y$ of Fig. 1.

The axle forming the subject-matter of this application, and illustrated in the drawings above referred to, consists, essentially, of two similar sections, A A', the operating ends of each section being formed with a flange or collar, $a$. The wheels B B are secured to the sections of the axle in the ordinary manner, and the outer end of each section is mounted in bearings C, of ordinary construction. The inner ends of each section of the axle, however, which ends abut the one against the other, are mounted in boxes D D', that are carried by the central longitudinal beam, E, of the truck, the lower box, D, being formed with an oil-receptacle, $c$, oil being delivered thereto through ducts $e\ e$, formed in the box D', and said ducts being fed by pipes F F, which lead to and are supported by the outer timbers, G, of the truck, each pipe F being closed by a cap, $f$, which prevents the entrance of cinders, dust, or matter of any kind which would be liable to enter and clog the pipes if their open ends were not protected, as described.

The longitudinal timber E is braced and supported against the side-thrust of the axle by means of bracing-irons H H, that are bolted to the timber, and also to the truck-frame, each iron being formed with branch arms $h\ h\ h'\ h'$, which said branch arms are bolted to the truck-timbers, as clearly shown in the drawings.

From the construction described it will be readily understood that each truck-wheel will be free to turn at any rate of speed desired, so that in passing around curves the speed of each wheel will correspond with the distance it has to travel, it being of course understood that the wheels upon the outer track necessarily travel faster than do the wheels upon the inner track; and by constructing the axle as described I am able to use a wheel the tread of which is parallel with the axis of the wheel instead of being tapering toward the end of the axle, as is the case with wheels that are rigidly connected to an undivided axle.

The advantage of this construction is very great, in view of the fact that all undue tensile strain upon the axle is avoided, as is also the wearing away of the wheel, due to the sliding of the wheels upon the track, as when the wheels so slide they become worn and rough and run very unevenly, thus producing a continual jolting of the cars and hammering the track, so that it soon becomes worn and irregular.

Having thus fully described my invention, what I claim as new, and desire to secure by Letters Patent, is—

1. The combination, with a car-axle formed in sections, each section being provided with a flange, $a$, of boxes D D', the box D being provided with an oil-receptacle, $c$, while the box D' is formed with ducts $e$, and tubes F, leading to the box D', substantially as described.

2. The combination, with a centrally-divided car-axle, of boxes D D', formed, respectively, with an oil-receptacle, $c$, and ducts $e$, and tubes F, leading to the box D, and supported by the car-truck, the open ends of the tubes being closed by caps $f$, substantially as described.

3. The combination, with a car-truck, of a centrally-divided axle supported in boxes carried by a central longitudinal timber, E, and bracing-irons H, formed with arms $h\ h'$, substantially as described.

WILLIAM JOHN MURRAY.

Witnesses:
H. C. DODGE,
JAMES W. CONE.